United States Patent [19]

Goldbach

[11] Patent Number: 5,190,451
[45] Date of Patent: Mar. 2, 1993

[54] EMISSION CONTROL FLUID BED REACTOR

[75] Inventor: Gerhardt O. Goldbach, San Jose, Calif.

[73] Assignee: Combustion Power Company, Inc., Menlo Park, Calif.

[21] Appl. No.: 831,884

[22] Filed: Feb. 6, 1992

Related U.S. Application Data

[63] Continuation-in-part of Ser. No. 672,067, Mar. 18, 1991.

[51] Int. Cl.$^5$ .............................................. F23D 14/00
[52] U.S. Cl. ........................................ 431/5; 110/204; 110/212; 110/245; 110/345; 422/139; 431/7
[58] Field of Search .............. 110/245, 345, 204, 212; 122/4 D; 431/5, 7; 422/139, 146, 147, 182

[56] References Cited

U.S. PATENT DOCUMENTS

| | | |
|---|---|---|
| 4,116,005 | 9/1978 | Willyoung . |
| 4,378,334 | 3/1983 | Alguire et al. ........................ 431/5 X |
| 4,767,315 | 8/1988 | Brannstrom et al. . |
| 4,843,981 | 7/1989 | Goldbach et al. . |
| 4,845,942 | 7/1989 | Schemenau et al. . |
| 4,913,097 | 4/1990 | Derksen et al. .................... 110/204 X |
| 4,928,635 | 5/1990 | Shelor . |
| 4,996,836 | 3/1991 | Reh et al. . |
| 5,016,435 | 5/1991 | Brannstrom . |
| 5,044,287 | 9/1991 | Furukawa et al. .............. 110/204 X |

FOREIGN PATENT DOCUMENTS

| | | |
|---|---|---|
| 44094 | 10/1981 | European Pat. Off. . |
| 3009366 | 9/1981 | Fed. Rep. of Germany . |
| 2583305 | 12/1986 | France . |
| 1601212 | 10/1981 | United Kingdom . |

OTHER PUBLICATIONS

Anon, "The Coal-Fired Air Furnace Combined Cycle Therodynamic Analysis of an Externally-Fired Gas Turbine Electric Generation Plant," Pittsburgh Energy Technology Center, U.S. Dept. of Energy, Jul. 1990.
Zabolotny, Vivenzio and Lettaye, "Externally-Fired Combined Cycle (EECC)," Proceedings of the American Power Conference, 52nd Annual Meeting, TP 90-26, Apr. 1990.

Primary Examiner—Edward G. Favors
Attorney, Agent, or Firm—Flehr, Hohbach, Test, Albritton & Herbert

[57] ABSTRACT

An emission control fluidized bed reactor is disclosed. The reactor includes a central chamber with a fluidized bed at the base of the central chamber and circulating particulate matter above the fluidized bed forming a freeboard. The fluidized bed is maintained at a temperature range between 1500° F. and 1600° F. The freeboard is operated in a predetermined environment between 1600° F. and 1700° F. and with a velocity between 4 to 12 feet per second. An externally fed gas from a discrete industrial process such as an external combustion system or a plant process is conveyed into the freeboard. The externally fed gas includes pollutants which are suppressed as a result of the predetermined environment in the freeboard.

14 Claims, 1 Drawing Sheet

EMISSION CONTROL FLUID BED REACTOR

This is a continuation-in-part of Ser. No. 07/672,067, filed Mar. 18, 1991, which is incorporated by reference herein.

BRIEF DESCRIPTION OF THE INVENTION

The present invention relates generally to fluidized bed reactors. More particularly, the present invention relates to a fluidized bed reactor which may be used to reduce unburned hydrocarbons, CO, $NO_x$, and other undesirable constituents of gaseous combustion products produced by a discrete industrial process.

BACKGROUND OF THE INVENTION

Fluidized bed reactors are known in the art. In particular, it is known to use fluidized beds for the combustion of dirty solid fuels, such as coal. During combustion, the fluidized bed reactor also suppresses toxic emissions by oxidizing burnable components of the fuel. For instance, limestone in the fluidized bed reacts with sulfur compounds in the fuel to generate calcium sulfate and thereby prevent the emission of $SO_x$ into the atmosphere.

U.S Pat. No. 4,843,981 (the '981 patent) discloses a fluidized bed reactor which recirculates a dense cloud of fine particulate. The cloud of particulate results in particle gas contact above the bed and thereby suppresses $SO_x$ emissions.

The '981 patent also teaches the injection of ammonia into the recycle cyclones of the reactor to suppress $NO_x$ emissions. This combustor has resulted in a clean burning low $SO_x$ and low $NO_x$ combustion system for solid fuel fired boilers and pressurized air heaters burning coal, coke, coal waste, petroleum coke, etc.

These prior art reactors have demonstrated the ability to operate at $NO_x$ and $SO_x$ emissions below 0.04 lbs/million BTU, with coke and coal fuels containing fuel bound nitrogen levels up to 2.5% and fuel bound sulfur of up to 3%. In these boiler and air heating applications, the fluid beds are operated as combustors to release energy to heat steam or compressed air by extracting energy from the fluid bed and the hot exhaust gas as required.

Pending U.S. patent application Ser. No. 07/672,067, filed Mar. 18, 1991, and assigned to the assignee of the present invention, discloses the concept of using a recirculating fluid bed reactor to clean the hot gas from a high temperature slagging coal combustor. The dirty gas from the combustor is passed through the freeboard of the reactor. The excess heat from the bed of the reactor is used to preheat the air upstream of the slagging combustor. Conditions in the fluid bed rector were optimized to clean the gas for the thermodynamic cycle described.

OBJECTS AND SUMMARY OF THE INVENTION

It is a general object of the present invention to utilize a fluid bed reactor to clean a variety of dirty gas streams from various types of combustors and process gas streams from various types of industrial processes.

It is a related object of the present invention to provide a fluid bed reactor with optimal operating conditions for cleaning combustion gases from a discrete industrial process.

It is a more particular object of the present invention to clean dirty industrial gas streams by removing HC, CO, $SO_x$, $NO_x$, $H_2S$, and other objectionable contaminants.

These and other objects are achieved by an emission control fluidized bed reactor. The reactor includes a central chamber with a fluidized bed at the base of the central chamber and circulating particulate matter above the fluidized bed forming a freeboard. The fluidized bed is maintained at a temperature range between 1500° F. and 1600° F. The freeboard is operated in a predetermined environment between 1600° F. and 1700° F. and with a velocity between 4 to 12 feet per second. An externally fed gas from a discrete industrial process such as an external combustion system or a plant process is conveyed into the freeboard. The externally fed gas includes pollutants which are suppressed as a result of the predetermined environment in the freeboard.

BRIEF DESCRIPTION OF THE DRAWINGS

Other objects and advantages of the invention will become apparent upon reading the following detailed description and upon reference to FIG. 1 which is a cross sectional view of a fluidized bed reactor which may be used in accordance with the present invention.

DETAILED DESCRIPTION OF THE INVENTION

Figure 1:
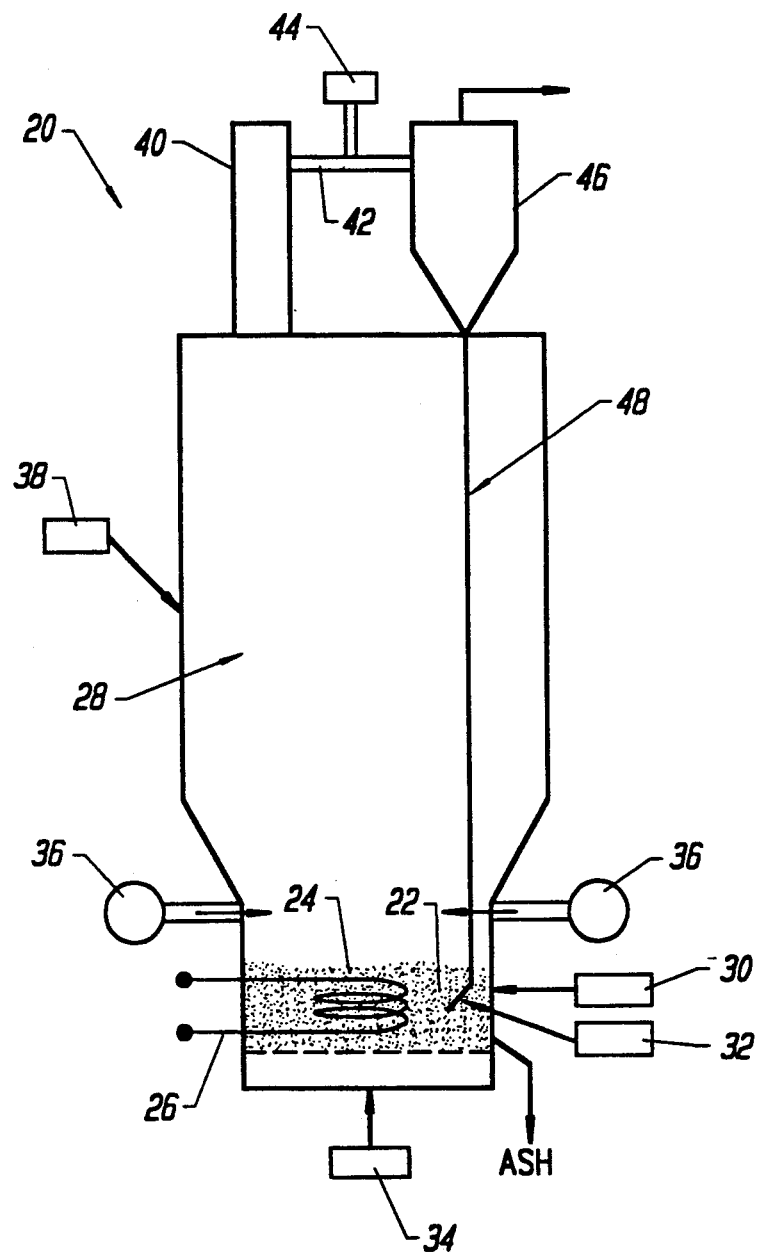

FIG. 1 depicts a fluidized bed reactor 20 which may be used in accordance with the present invention. The reactor 20 includes a fluidized bed 22 with a bed surface 24. A heat exchanger 26 is positioned within the bed. Above the bed surface 24 is an expanded freeboard area 28. The fluidized bed 22 provides a dense cloud of fine particulate at an appropriate temperature for suppression of pollutants in the freeboard 28.

A fuel injector 30 injects fuel and a limestone injector 32 injects limestone into the fluidized bed 22 An air injector 34 injects air into the fluidized bed 22.

Pollutant intakes 36 are provided for injecting polluted gases from a discrete industrial process such as an external combustion system or plant process. The polluted gases may contain such pollutants as HC, CO, $SO_x$, $H_2S$, and $NO_x$. The polluted gases are injected into the freeboard 28 directly over the fluid bed surface 24. The polluted gases mix thoroughly with the particulate and hot gas leaving the fluidized bed 22.

The hot gas and particulate leave the freeboard 28 through a riser 40 and are subsequently conveyed through a duct 42 to a high efficiency cyclone 46. The cyclone 46 returns all of the coarse particulates to the fluid bed, allowing only the finest particles to escape. The coarse particulates are returned to the bed via downcomer return pipe 48. An ammonia injector 44 may be used to inject ammonia in the gas stream within the duct 42. The ammonia selectively reacts with $NO_x$ to suppress the $NO_x$.

The primary difference between the prior art fluidized bed combustor and the emission control fluidized bed reactor 20 of the present invention is the relative operation of the fluidized bed 22. In the fluidized beds used for energy generation, the unit throughput within the fluidized bed is high and the freeboard operates at a slightly higher space velocity than the bed. In contrast, the emission control reactor 20 of the present invention has a reduced superficial bed velocity and an increased freeboard velocity since combustion products from the fluidized bed 22 and a discrete industrial process flow through the freeboard 28. The emission control reactor 20 of the present invention also departs from the prior art in that the temperature and oxygen conditions are maintained at optimal levels for the reduction of pollutants, not the combustion of a fuel.

Having disclosed the general components and general features of the present invention, attention now turns to details associated with the invention. The combustion of a fuel in bed 22 provides energy for calcination reactions. In particular, the fluid bed 22 operates at a temperature between 1500° F. and 1600° F., preferably between 1550° F. and 1575° F., for efficient calcining of limestone and the combustion of hydrocarbons. Preferably, the bed 22 has a depth of between 2 to 4 feet and a superficial velocity of between 2 to 2.5 feet/second.

Fuel injector 30 may inject one or more fuels into bed 22. The injected fuel may be a dirty solid fuel, such as coal or refinery coke, a dirty liquid fuel such as Bunker C, or a dirty gaseous fuel. Alternately, a clean fuel may also be employed Limestone injector 32 injects limestone into the bed 22 in a conventional manner.

By regulating the amount of heat withdrawn from the bed 22, the specific oxygen level in the freeboard may be precisely controlled to provide more efficient $SO_x$ and $NO_x$ suppression. The oxygen level ranges from 0% to 18% with a preferable range of between 2% to 4%. Heat extraction from the bed 22 can be accomplished by using heat exchanger 26. Heat extraction may also be accomplished by air heating, evaporation, steam superheating, steam reheating, or other process fluid heating. Regardless of the embodiment, the heat removed by the heat exchanger may be used to preheat combustion air or to provide heat to any appropriate process stream. The oxygen level may also be adjusted by passing additional air through the bed 22 or by injecting fuel into the freeboard 28. Air injector 34 may be used for directing a continuous stream of fluidizing air through the bed 22 and into the freeboard 28.

An expanded freeboard 28 is provided in accordance with the invention. The freeboard 28 is designed to provide a reaction time of approximately 3 seconds. Thus, for a freeboard with a height in the range of 20 to 30 feet, space velocities of between 4 and 12 feet/second would be employed. The expanded freeboard 28 helps accommodate the variation in gas flow produced by the injected gaseous pollutant. The freeboard is maintained between 1600° F. and 1700° F.

The flow rate of the pollutant containing gases injected into the freeboard through pollutant intakes 36 may be up to 5 times that of the gases emanating from the fluid bed. The pollutant gases may contain oxygen levels from 0% oxygen to 16% oxygen and is usually a hot gas with a temperature limit of 1750° F. If the pollutant containing gases are cooler than 1650° F., a supplemental fuel injector 38 is used to add fuel to increase the temperature in the freeboard 28 to the desired temperature range.

Combustion rates, air rates, and excess air required within the fluid bed are dependent upon the external pollutant containing gas stream. Where the $O_2$ levels in the incoming external pollutant bearing gas stream are low, the fluid bed will be operated at higher excess air condition to provide the necessary $O_2$ for the fuel burning in the freeboard and for providing the minimum $O_2$ level necessary for the $NO_x$ and $SO_2$ controls and fuel species burnout.

Typical reactions which occur in the freeboard include: (1) oxidation of HC to $H_2O$ and $CO_2$, (2) oxidation of CO to $CO_2$, (3) oxidation of $H_2S$ to $H_2O$ and $SO_2$. (4) capture of $SO_x$ by CaO to produce Calcium Sulfate ($CaSO_4$), and (5) selective oxidation of $NO_x$ by Ammonia ($NH_3$) to produce $N_2$ and $H_2O$. Each of these reactions requires the presence of oxygen and a temperature in the range of 1600° F. to 1700° F., preferably 1650° F. Consequently, as discussed, means are provided to generate these conditions in the freeboard regardless of the temperature or oxygen concentration of the incoming pollutant gases. For instance, if the incoming gases are cooler than 1650° F., a supplemental fuel injector 38 is used to add fuel to increase the temperature in the freeboard 28. If additional oxygen is required, it may be provided by reducing the amount of heat withdrawn from the bed.

The hot gas and particulate leave the freeboard 28 through a riser 40 and are subsequently conveyed through a duct 42 to a high efficiency cyclone 46. The cyclone 46 returns all of the coarse particulates to the fluid bed, allowing only the finest particles to escape. Preferably, the cyclones are designed for a 50% cut-point of 10 microns. The coarse particulates are returned to the bed via downcomer return pipe 48.

The recirculating flow of calcium oxide based particulates is 50 to 150 times that of the incoming limestone feed. This dense cloud of particulate greatly enhances reactivity with the gas. The inlet velocity to the cyclones is 85 to 95 ft/second, a velocity sufficiently high that the abrasion from the wall of the cyclone abrades reacted calcium sulfate from the surface exposing calcium oxide for fresh reaction with sulfur bearing gases. The inlet velocity also insures proper residence time, temperature, and turbulence to minimize $NH_3$ use and therefore the escape of $NH_3$ reactant.

The intensity of the turbulence within the cyclone promotes mixing and enhances the reaction. Other solid gaseous chemical getters may be introduced into the fluid bed reactor 20 to remove other species of pollutant.

Preferably, the emission control reactor 20 is fired to its target temperature of between 1600° F. and 1700° F. prior to receiving an external gas source. If the emission control reactor 20 is not in this temperature range, emission suppression will not be optimal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A fluidized bed reactor comprising:
   a central chamber;
   means for receiving an externally fed gas from a discrete industrial process, said receiving means being coupled to said central chamber to convey said gas to said chamber, said gas containing contaminants;

means for circulating particulate matter within said central chamber;

means for producing an operating temperature of at least 1,500° F. within said central chamber; and means for maintaining a freeboard oxygen level of not more than 4% in said central chamber, said producing means and said maintaining means facilitating chemical reactions between said gas and said circulating particulate matter to reduce said contaminants in said gas.

2. The apparatus of claim 1 wherein said fluidized bed reactor includes means for injecting a gaseous reactant, said injected gaseous reactant chemically reacting with said gas to reduce said contaminants in said gas.

3. The apparatus of claim 2 wherein said contaminants include $SO_x$ and $NO_x$, said circulating particulate matter includes CaO, and said injected gaseous reactant includes ammonia.

4. The apparatus of claim 3 wherein said fluidized bed reactor includes a cyclone riser positioned on top of said chamber, a recycle cyclone positioned on top of said chamber, said means for injecting a gaseous reactant positioned between said cyclone riser and said recycle cyclone on top of said chamber, and a return conduit positioned within said chamber for returning said particulate matter from said recycle cyclone to said chamber.

5. The apparatus of claim 4 including means for directing a continuous stream of fluidizing gas from below said fluidized bed and upwards within said freeboard so as to fluidize said particles of said bed.

6. The apparatus of claim 5 wherein said externally fed gas is up to five times the flow rate of said continuous stream from said fluidized bed.

7. The apparatus of claim 5 wherein said recycle cyclone captures substantially all of said fine particles from said continuous stream and returns substantially all of said captured particles to said fluidized bed via said return conduit, thereby defining a recycling path of movement from said bed through said freeboard and back into said bed, said recycling path being maintained at a substantially constant temperature.

8. A method of operating a fluidized bed reactor which comprises a central chamber with a fluidized bed at the base of said central chamber and circulating particulate matter above said fluidized bed forming a freeboard, said method comprising the steps of:

maintaining said fluidized bed in a temperature range between 1500° F. and 1600° F.;

operating said freeboard in a predetermined environment between 1600° F. and 1700° F. and with a velocity between 4 to 12 feet per second; and receiving an externally fed gas from a discrete industrial process within said central chamber, said externally fed gas including pollutants which are suppressed within said freeboard.

9. The method of claim 8 wherein said operating step is adjusted in response to said receiving step to maintain said predetermined environment.

10. The method of claim 9, wherein the oxygen level of said freeboard is maintained between 0 and 18%.

11. A method of operating a fluidized bed reactor which comprises a central chamber with a fluidized bed at the base of said central chamber and circulating particulate matter above said fluidized bed forming a freeboard, said method comprising the steps of:

receiving an externally fed gas from a discrete industrial process, said gas containing contaminants;

operating said fluidized bed at a temperature of at least 1500° F.;

generating a temperature of at least 1600° F. within said freeboard;

maintaining an oxygen level of less than 4% within said freeboard so that said generating and maintaining steps facilitate chemical reactions between said gas and said circulating particulate matter to reduce said contaminants in said gas.

12. The method of claim 11 further including the step of injecting a gaseous reactant into said circulating particulate material to reduce said contaminants in said gas.

13. The method of claim 12 wherein said contaminants include $SO_x$ and $NO_x$, said circulating particulate matter includes CaO, and said injected gaseous reactant includes ammonia.

14. The method of claim 12 including the step of directing a continuous stream of fluidizing gas from below said fluidized bed and upwards within said freeboard so as to fluidize said particles of said bed.

* * * * *